Aug. 25, 1959 P. KENYON 2,901,541

TELEGRAPH RECEIVERS

Filed May 8, 1956 3 Sheets-Sheet 1

Inventor
PHILIP KENYON
By Young, Emery & Thompson
Attorneys

Inventor
PHILIP KENYON
By Young, Emery & Thompson
Attorneys

Aug. 25, 1959 P. KENYON 2,901,541

TELEGRAPH RECEIVERS

Filed May 8, 1956 3 Sheets-Sheet 3

Inventor
PHILIP KENYON
By Young, Emery & Thompson
Attorneys

United States Patent Office 2,901,541

Patented Aug. 25, 1959

2,901,541

TELEGRAPH RECEIVERS

Philip Kenyon, Liverpool, England, assignor to Automatic Telephone & Electric Company Limited, Liverpool, England, a British company Application May 8, 1956, Serial No. 583,389

Claims priority, application Great Britain May 25, 1956

4 Claims. (Cl. 178—88)

The present invention relates to receiving arrangements for carrier signalling systems.

In order to reproduce correctly at the receiving station the original square wave amplitude modulated signals normally used in such systems, it is necessary to operate the receiving mechanism, usually a telegraph relay, at the commencement of each received "mark" and "space" period. The exact instant defining the commencement of a signal is not, however, readily detectable, because of the rounding of the original square wave form due to the restricted frequency band which can normally be allotted to one signalling channel.

Receivers for carrier current signalling systems are known in which means are provided for detecting the instants at which the signal amplitude passes through a value which is half the maximum amplitude, and by suitable design of the receiving networks these instants can be made to correspond to the start of the mark and space periods, which were sharply defined in the original signal wave. It has previously been proposed to provide a bias of half the maximum amplitude of the received signal, and to apply this to the received signal after demodulation and if this is done in the correct sense, the demodulated signal will have zero voltage at those instants when its modulation amplitude is half its maximum.

The bias may most readily be provided by means of a capacitor charged from a potential divider supplied by the demodulated signal, but a difficulty arises in keeping the bias at the correct level. The capacitor circuit must have a fairly long time constant to prevent its charge from leaking away entirely during a space period, but at the same time it is desirable for it to have a short time constant so that the bias may adjust itself rapidly to changes in received signal level. These conflicting requirements lead to a compromise arrangement which in certain circumstances may give a satisfactory reproduction of the transmitted signal.

The compromise is, however, unsatisfactory in cases where the mark/space ratio of the signal is continuously varying, especially if the variation is wide. The reason for this is that the time constant of the capacitor circuit providing the bias cannot be made very long compared with the maximum possible duration of a mark or space signal, and its charge will therefore leak away more during a long space signal than it would during a short space signal. The bias applied to the demodulated signal will thus vary with variation of the mark/space ratio, and the receiving device will not be operated correctly at the instant of change from space to mark.

It is the object of the present invention to provide a simple receiver for carrier current signals in which distortion of this type is minimized.

The present invention accordingly provides a carrier current signal receiver having a signal responding device controlled by the current flow through a thermionic tube to the control grid of which is applied a control potential derived by demodulation from the incoming signal together with a first control bias derived by rectification from the incoming signal in which a second control bias also derived by rectification from the incoming signal is applied to the control grid in opposition to said first bias, the difference in value between said first bias and said second bias producing an effective negative bias on said control grid which is maintained substantially constant due to the fact that the time constants of the circuits from which said first bias and said second bias are obtained are such that the circuit providing the bias of greater value has the longer time constant.

The nature of the invention will be understood from the following description of one embodiment which should be read in conjunction with the accompanying drawings comprising Figs. 1–4. Of the drawings.

Figure 1:
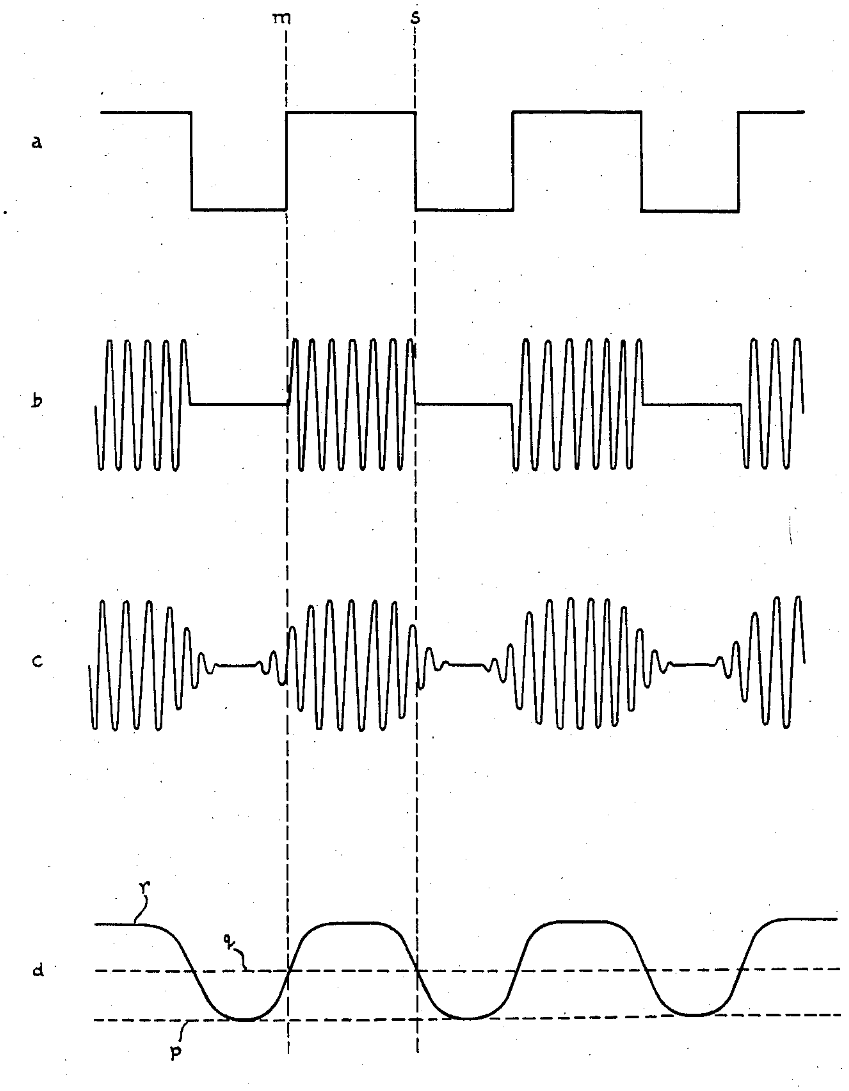
Fig. 1 shows signal wave forms at different stages in the system.

Referring to the drawings, wave form *a* of Fig. 1 shows a D.C. telegraph signal before application to the modulator at the sending terminal. The vertical broken lines *m* and *s* indicate the start of a mark and a space period respectively. The signal may be of the single or double current type. Wave form *b* illustrates a modulated signal at the carrier frequency at the output of the modulator, and at this stage the wave retains the square form of the original D.C. signal. The keying frequency and the carrier frequency would normally be much more widely separated than appears from the drawing. Wave form *c* illustrates the shape of the wave as it is applied to the demodulator at the receiving terminal. The sharp changes in amplitude have been rounded during transmission and filtering, but it can be seen that if the receiving networks are suitably designed, the broken lines *m* and *s* can be made to correspond to the instants at which the modulation envelope has an amplitude equal to half its maximum.

Wave form *d* of Fig. 1 shows the signal wave after demodulation in single current form, where the axis *p* is the zero voltage level. The maximum amplitude of the signal is thus $r—p$, and if a bias $q—p$ of half this maximum amplitude is applied to the signal in the negative sense, the axis *q* will represent the new zero voltage level. It will be seen that the instants at which the signal voltage cuts this axis correspond to the instants of transition in the original signal.

Figure 2:
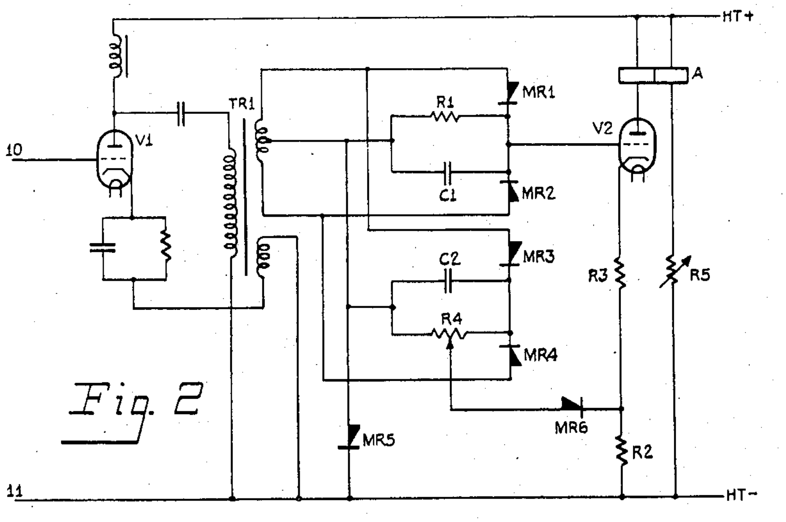
Fig. 2 shows a signal receiving arrangement.

Fig. 2 shows a receiving circuit in which such a bias may be applied to the demodulated signal. Terminals 10 and 11 connect the receiver to the signalling channel following such filtering and matching networks as may be necessary. Tube V1 amplifies the carrier signal which is then applied via a capacitor to the primary winding of transformer TR1. The secondary winding of this transformer is connected to a full-wave rectifying arrangement comprising rectifiers MR1 and MR2, and the demodulated signal is developed across resistor R1 and capacitor C1 in parallel. The charge on capacitor C1 is applied to tube V2 via rectifier MR5 and biasing resistors R2 and R3. The circuit comprising capacitor C1 and resistor R1 is arranged to have a short time constant so that the charge on this capacitor responds quickly to transistions between mark and space in the demodulated signal.

A control bias for tube V2 is obtained from a second full-wave rectifying arrangement comprising rectifiers MR3 and MR4, the bias being developed across resistor R4 in parallel with capacitor C2. This bias has the same maximum amplitude as the demodulated signal developed across resistor R1, but only half this value is required, and this is obtained from the tapping on resistor R4 and applied to tube V2, in opposite sense to the demodulated signal, in series with rectifier MR6. The circuit comprising resistor R4 and capacitor C2 is arranged to have a much longer time constant than that supplying the demodulated signal, and the bias derived from it is arranged to be as near constant as possible. The time constant of this circuit cannot, however, be made very long, because the bias would not then follow the changes in level of the received signal.

The effect of the combination of the demodulated signal and this bias is to control the curent flow through the lefthand winding of telegraph relay A in such a way that the relay armature adopts one of its stable positions during reception of a mark signal, and adopts the other during reception of a space signal. During the "no-signal" condition, the voltage drop across resistor R2 biases rectifier MR5 in the forward direction, and the grid of tube V2 is thereby effectively held at the potential of HT—ve. The standing bias due to current in resistors R2 and R3 controls the current in the left-hand winding of relay A which partially balances that in the right-hand winding when resistor R5 is suitably adjusted, and the relay assumes the "space" condition. When signals are being received, the voltage developed across resistor R4 biases rectifier MR6 in the forward direction and rectifier MR5 in the backward direction and the grid of tube V2 is now effectively held at the potential of the junction point of resistors R2 and R3, and the permanent "space" bias due to resistor R2 is thus removed. The relay A is now balanced, and will respond equally to mark and space signals.

It will be appreciated that capacitors C1 and C2 will discharge between trains of impulses, and for the circuit to operate with as little distortion as possible, it is desirable for these capacitors to be charged quickly at the beginning of the first mark signal of a new impulse train. To increase the sensitivity of the circuit, a negative feedback winding is added to transformer TR1 in series with tube V1, the voltage feedback being effective in reducing the impedance of the output circuit of the tube. A further improvement is obtained by using a stepdown ratio in transformer TR1. The response time of relay A is also reduced by the negative feed-back due to resistors R2 and R3 in series with the cathode of tube V2, the current feedback being effective in increasing the impedance of the output circuit of the tube and thus reducing the time constant of the inductive relay circuit.

Figure 4:
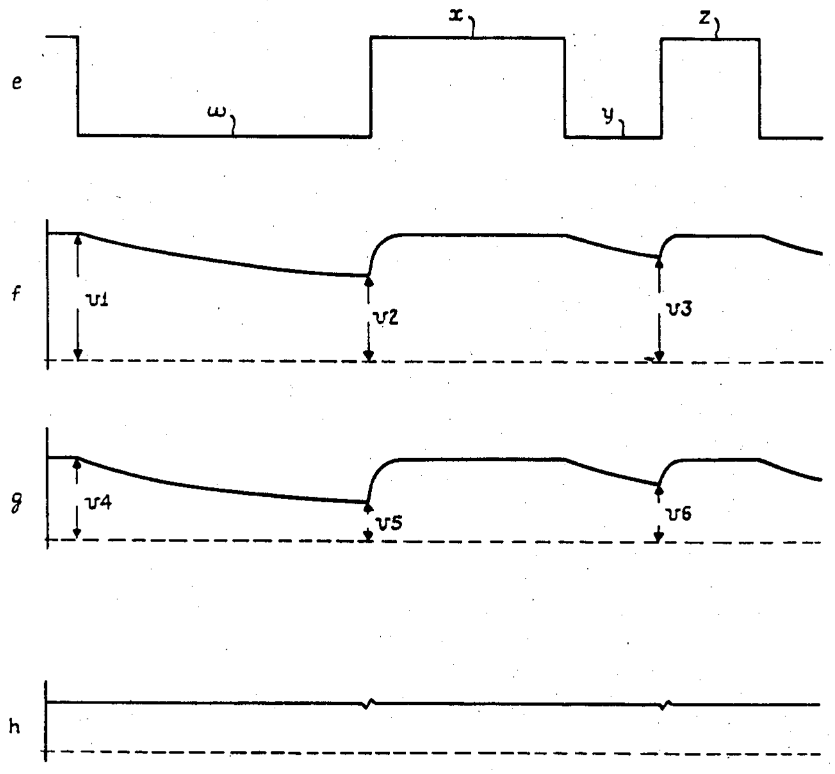
Fig. 4 shows how the derived biases relate to the transmitted signal.

This circuit may be made to operate satisfactorily when transmission is confined to transmissions of equally spaced impulses of equal duration. The effect of changes in the mark/space ratio of a received impulse train, however, is to introduce distortion, as may be seen by reference to Fig. 4. In this drawing, wave form *e* is an idealised representation of a received signal in which a long space *w* is followed by a long mark *x*, and a further short space *y* and mark *z* have equal durations. Wave form *f* shows the control bias voltage developed across the effective portion of resistor R4. The broken line indicates the potential of HT—ve and the continuous line the potential at the tapping point of the resistor. The control bias thus applied to the grid of tube V2 from this resistor is $v1$ during a mark signal, but it will be seen that this is reduced by discharge of capacitor C2 during a space signal. At the end of the space signal w, the bias from this capacitor is reduced to $v2$, but the capacitor quickly charges again at the beginning of the next mark signal *x*, and the bias is restored to $v1$. During the next space signal *y*, the bias is again reduced, but this signal is shorter than the previous space signal, and this time the bias falls only to $v3$ before the start of the next mark signal.

From this it will be seen that the control bias is not only different at the commencement of mark and space signals, but may vary from one mark signal to another. While the first type of variation might be compensated by suitable adjustment of the current in the two windings of the relay, this cannot be effective in correcting distortion caused by the second type of variation.

Figure 3:
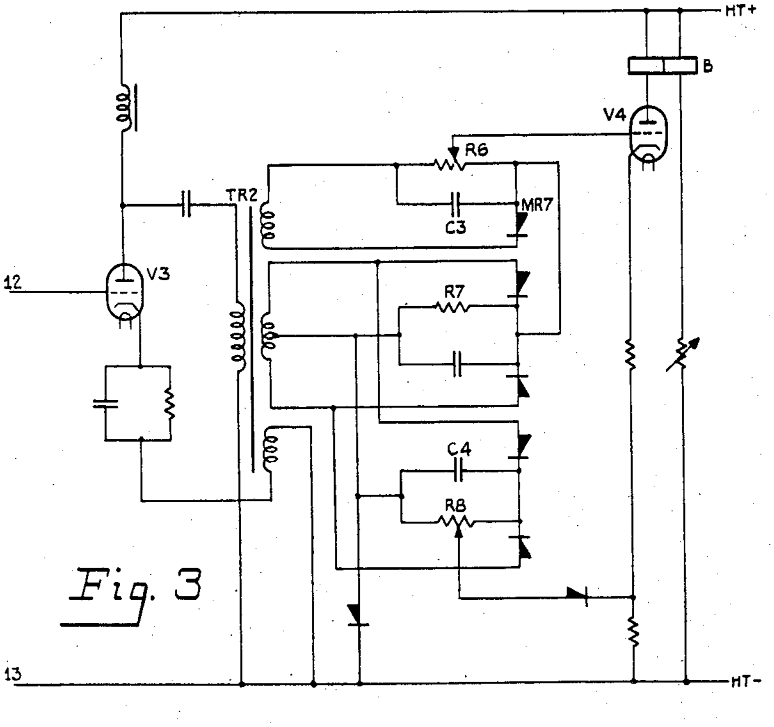
Fig. 3 shows a signal receiving arrangement according to the invention.

In the circuit of the invention shown in Fig. 3, a further control bias also derived by rectification of the received signal is applied to the grid of tube V4. An output from another secondary winding of transformer TR2 is rectified by rectifier MR7, the rectified signal being developed across resistor R6 in parallel with capacitor C3. Part of this signal is fed to the grid of tube V4 in series with the demodulated signal developed across resistor R7, which corresponds with resistor R1 in Fig. 2. The time constant of the circuit comprising resistor R6 and capacitor C3 is smaller than that of the circuit comprising resistor R8 and capacitor C4, which correspond with resistor R4 and capacitor C2 in Fig. 2. The wave form of the bias derived from this circuit is shown at *g* in Fig. 4, the continuous line representing the voltage at the tapping point of resistor R6 with respect to the potential at the junction point of resistors R6 and R7, indicated by the broken line. It will be seen that the wave-form is similar to that at *f*, but it is arranged that the voltage level is always lower by a value of half the maximum amplitude of the signal developed across resistor R7. Thus:

$$v1-v4=v2-v5=v3-v6$$

and since these control biases are applied to tube V4 in opposite sense, the resultant effective bias is a continuous voltage of half the maximum signal applied to the tube. This is shown at *h* in Fig. 4. It will be seen that the bias level is substantially constant, only a slight fluctuation occurring at the commencement of each mark signal. This is not, however, great enough to give rise to appreciable distortion. The effective bias level will remain constant to this extent throughout the reception of a signal, but the time constants of the circuits of capacitors C3 and C4 may be short enough to allow the bias to change quickly with a change in received signal level, and it will also fall to zero after the end of an impulse train.

I claim:

1. A carrier current signal receiver comprising a thermionic tube, a signal responding device controlled by current flow in said tube, means for demodulating the incoming carrier current signal and for applying the demodulated signal to said thermionic tube, means for applying a substantially constant negative bias to said thermionic tube and comprising a first rectifying circuit having a first time constant and provided for deriving a first control bias from said incoming signal and for applying said first control bias to said thermionic tube and a second rectifying circuit having a second time constant less than said first time constant and provided for deriving a second control bias from said incoming signal and for applying said second control bias to said thermionic tube in opposition to said first control bias.

2. A carrier current signal receiver as claimed in claim 1 in which said constant negative bias has a value substantially half the maximum amplitude of said control potential.

3. A carrier current signal receiver as claimed in claim 1 in which said time constants are adjusted so that the change which takes place in said first control bias during a space period is equal to the change which takes place in said second control bias during the same period.

4. A carrier current signal receiver as claimed in claim 1, in which said first control bias is negative and is greater than said second control bias.

References Cited in the file of this patent

UNITED STATES PATENTS

| | | |
|---|---|---|
| 2,338,399 | Bingley | Jan. 4, 1944 |
| 2,523,717 | Pfleger | Sept. 26, 1950 |
| 2,577,755 | Hargraves et al. | Dec. 11, 1951 |
| 2,613,272 | Terry et al. | Oct. 7, 1952 |
| 2,657,262 | Prior | Oct. 27, 1953 |